(12) United States Patent
Kim

(10) Patent No.: US 12,450,884 B1
(45) Date of Patent: Oct. 21, 2025

(54) METHOD FOR TRAINING CUSTOM MODEL BASED ON PRE-TRAINED BASE MODEL AND LEARNING DEVICE USING THE SAME

(71) Applicant: Superb AI Co., Ltd., Seoul (KR)

(72) Inventor: Kye Hyeon Kim, Seoul (KR)

(73) Assignee: Superb AI Co., Ltd. (KR)

( * ) Notice: Subject to any disclaimer, the term of this patent is extended or adjusted under 35 U.S.C. 154(b) by 0 days.

(21) Appl. No.: 18/940,109

(22) Filed: Nov. 7, 2024

(30) Foreign Application Priority Data

Oct. 21, 2024  (JP) ................. 2024-185256

(51) Int. Cl.
| | |
|---|---|
| *G06V 10/774* | (2022.01) |
| *G06N 3/08* | (2023.01) |
| *G06N 3/084* | (2023.01) |
| *G06T 7/00* | (2017.01) |
| *G06V 10/44* | (2022.01) |
| *G06V 10/77* | (2022.01) |
| *G06V 10/80* | (2022.01) |
| *G06V 10/82* | (2022.01) |

(52) U.S. Cl.
CPC ........ *G06V 10/774* (2022.01); *G06V 10/7715* (2022.01); *G06V 10/80* (2022.01); *G06N 3/08* (2013.01); *G06N 3/084* (2013.01); *G06T 7/00* (2013.01); *G06T 2207/20081* (2013.01); *G06T 2207/20084* (2013.01); *G06V 10/454* (2022.01); *G06V 10/82* (2022.01)

(58) Field of Classification Search
CPC ........ G06N 3/047; G06N 3/084; G06N 3/044; G06N 3/045; G06N 3/08; G06V 10/774; G06V 10/7715; G06V 10/80; G06V 10/82; G06V 10/454; G06T 2207/20081; G06T 2207/20084; G06T 7/00
See application file for complete search history.

(56) References Cited

U.S. PATENT DOCUMENTS

| | | | |
|---|---|---|---|
| 10,733,480 B2 * | 8/2020 | Kumar | ................. G06V 10/25 |
| 2020/0293870 A1 | 9/2020 | Isikdogan et al. | |
| 2023/0115321 A1 | 4/2023 | Vu et al. | |

OTHER PUBLICATIONS

Muhammed et al.,( NPL "A Comparative Study of Different Pre-Trained Deep Learning Models and Custom CNN for Pancreatic Tumor Detection" Published May 10, 2023 (pp. 515-526), (Year: 2023).*

(Continued)

*Primary Examiner* — Quoc A Tran
(74) *Attorney, Agent, or Firm* — Husch Blackwell LLP

(57) ABSTRACT

The present disclosure provides a method for training a custom model based on a pre-trained base model. The custom model is configured to include a base model having at least one pre-trained feature extraction block, at least one adaptation block, at least one residual unit, and a task head block, and update at least part of the task head block, the at least one residual unit and the at least one adaptation block through a backpropagation using a task loss, while not updating parameters of the base model. Further, at least one residual feature (generated through the at least one residual unit) and at least one converted feature (generated by converting the at least one intermediate feature through the at least one adaptation block) are fused to thereby allow a learning device to achieve an advanced inference.

20 Claims, 7 Drawing Sheets

(56) References Cited

OTHER PUBLICATIONS

Kassani et al.,( NPL2 "Deep transfer learning based model for colorectal cancer histopathology segmentation: A comparative study of deep pre-trained models" Published Sep. 25, 2021 (11 Pages) (Year: 2021).*
Fernando et al.,( NPL3 "Alignment of Local and Global Features from Multiple Layers of Convolutional Neural Network for Image Classification" Published 2019 (2 Pages) (Year: 2019).*
Chen et al. "Rock image classification using deep residual neural network with transfer learning," Oct. 25, 2022, 20 pages.
Chenhui and Chunling, "A Transfer Learning Method Based on Residual Block," with Notice, 8 pages.
Office Action issued by the Korean Patent Office on Jan. 6, 2025, in Application No. 10-2024-0147069, 8 pages.
Hu Bing et al., "Detection of PCB Surface 1-15 INV. Defects With Improved Faster-RCNN and G06N3/045 Feature Pyramid Network", vol. 8, Jun. 9, 2020 (pp. 108335-108345) (Year: 2020).
Zhang Haotian et al., "Large Scale 1-15 Foundation Models for Intelligent Manufacturing Applications: A Survey", https://arxiv.org/pdf/2312.06718v3 (p. 8) (Year: 2023).
Extended European Search Report issued by the European Patent Office on Jun. 2, 2025, in Application No. 24209500.8, 12 pages.

* cited by examiner

FIG. 3

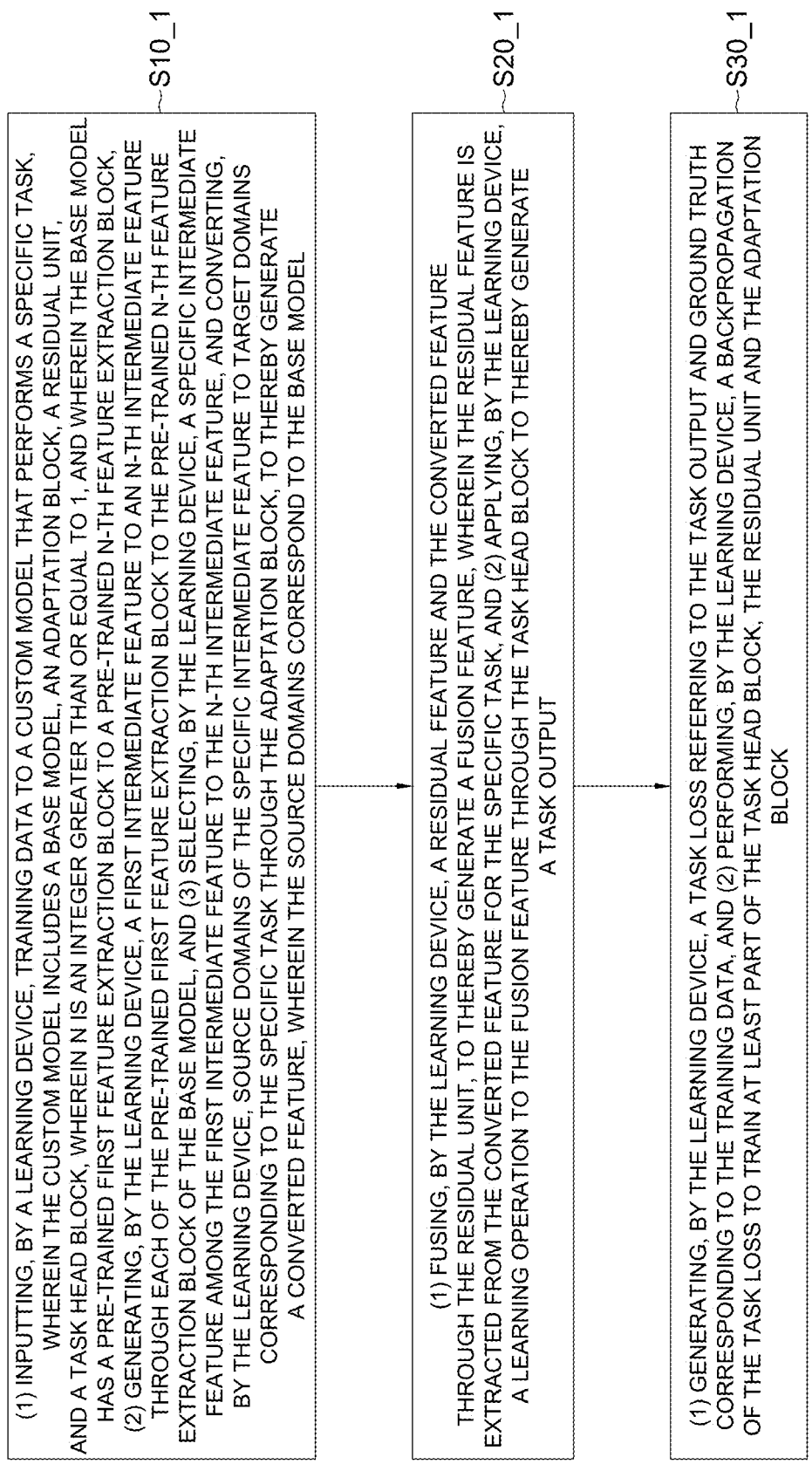

S10_1: (1) INPUTTING, BY A LEARNING DEVICE, TRAINING DATA TO A CUSTOM MODEL THAT PERFORMS A SPECIFIC TASK, WHEREIN THE CUSTOM MODEL INCLUDES A BASE MODEL, AN ADAPTATION BLOCK, A RESIDUAL UNIT, AND A TASK HEAD BLOCK, WHEREIN N IS AN INTEGER GREATER THAN OR EQUAL TO 1, AND WHEREIN THE BASE MODEL HAS A PRE-TRAINED FIRST FEATURE EXTRACTION BLOCK TO A PRE-TRAINED N-TH FEATURE EXTRACTION BLOCK, (2) GENERATING, BY THE LEARNING DEVICE, A FIRST INTERMEDIATE FEATURE TO AN N-TH INTERMEDIATE FEATURE THROUGH EACH OF THE PRE-TRAINED FIRST FEATURE EXTRACTION BLOCK TO THE PRE-TRAINED N-TH FEATURE EXTRACTION BLOCK OF THE BASE MODEL, AND (3) SELECTING, BY THE LEARNING DEVICE, A SPECIFIC INTERMEDIATE FEATURE AMONG THE FIRST INTERMEDIATE FEATURE TO THE N-TH INTERMEDIATE FEATURE, AND CONVERTING, BY THE LEARNING DEVICE, SOURCE DOMAINS OF THE SPECIFIC INTERMEDIATE FEATURE TO TARGET DOMAINS CORRESPONDING TO THE SPECIFIC TASK THROUGH THE ADAPTATION BLOCK, TO THEREBY GENERATE A CONVERTED FEATURE, WHEREIN THE SOURCE DOMAINS CORRESPOND TO THE BASE MODEL

S20_1: (1) FUSING, BY THE LEARNING DEVICE, A RESIDUAL FEATURE AND THE CONVERTED FEATURE THROUGH THE RESIDUAL UNIT, TO THEREBY GENERATE A FUSION FEATURE, WHEREIN THE RESIDUAL FEATURE IS EXTRACTED FROM THE CONVERTED FEATURE FOR THE SPECIFIC TASK, AND (2) APPLYING, BY THE LEARNING DEVICE, A LEARNING OPERATION TO THE FUSION FEATURE THROUGH THE TASK HEAD BLOCK TO THEREBY GENERATE A TASK OUTPUT

S30_1: (1) GENERATING, BY THE LEARNING DEVICE, A TASK LOSS REFERRING TO THE TASK OUTPUT AND GROUND TRUTH CORRESPONDING TO THE TRAINING DATA, AND (2) PERFORMING, BY THE LEARNING DEVICE, A BACKPROPAGATION OF THE TASK LOSS TO TRAIN AT LEAST PART OF THE TASK HEAD BLOCK, THE RESIDUAL UNIT AND THE ADAPTATION BLOCK

FIG. 5

S10_2 — (A) (1) INPUTTING, BY A LEARNING DEVICE, TRAINING DATA TO A CUSTOM MODEL THAT PERFORMS A SPECIFIC TASK, WHEREIN THE CUSTOM MODEL INCLUDES A BASE MODEL HAVING A PRE-TRAINED FIRST FEATURE EXTRACTION BLOCK TO A PRE-TRAINED N-TH FEATURE EXTRACTION BLOCK, WHEREIN N IS AN INTEGER GREATER THAN OR EQUAL TO 2, A FIRST ADAPTATION BLOCK TO A K-TH ADAPTATION BLOCK, WHEREIN K IS AN INTEGER GREATER THAN OR EQUAL TO 2 AND LESS THAN OR EQUAL TO N, A FIRST RESIDUAL UNIT TO A K-TH RESIDUAL UNIT, AND A TASK HEAD BLOCK, (2) GENERATING, BY THE LEARNING DEVICE, A FIRST INTERMEDIATE FEATURE TO AN N-TH INTERMEDIATE FEATURE THROUGH EACH OF THE PRE-TRAINED FIRST FEATURE EXTRACTION BLOCK TO THE PRE-TRAINED N-TH FEATURE EXTRACTION BLOCK OF THE BASE MODEL, AND (3) SELECTING, BY THE LEARNING DEVICE, A FIRST SPECIFIC INTERMEDIATE FEATURE TO A K-TH SPECIFIC INTERMEDIATE FEATURE RESPECTIVELY AMONG THE FIRST INTERMEDIATE FEATURE TO THE N-TH INTERMEDIATE FEATURE, AND CONVERTING, BY THE LEARNING DEVICE, THE FIRST SPECIFIC INTERMEDIATE FEATURE TO THE K-TH SPECIFIC INTERMEDIATE FEATURE RESPECTIVELY TO TARGET DOMAINS CORRESPONDING TO THE SPECIFIC TASK THROUGH THE FIRST ADAPTATION BLOCK TO THE K-TH ADAPTATION BLOCK RESPECTIVELY, TO THEREBY GENERATE A FIRST CONVERTED FEATURE TO A K-TH CONVERTED FEATURE RESPECTIVELY, WHEREIN THE SOURCE DOMAINS CORRESPOND TO THE BASE MODEL

S20_2 — (1) FUSING, BY THE LEARNING DEVICE, A FIRST RESIDUAL FEATURE AND THE FIRST CONVERTED FEATURE THROUGH THE FIRST RESIDUAL UNIT, TO THEREBY GENERATE A FIRST FUSION FEATURE, WHEREIN THE FIRST RESIDUAL FEATURE IS EXTRACTED FROM THE FIRST CONVERTED FEATURE FOR THE SPECIFIC TASK, (2) FUSING, BY THE LEARNING DEVICE, AN (I-1)-TH FUSION FEATURE AND AN I-TH CONVERTED FEATURE, TO THEREBY GENERATE AN I-TH TEMPORARY FEATURE, WHEREIN I IS AN INTEGER GREATER THAN OR EQUAL TO 2 AND LESS THAN OR EQUAL TO K, (3) FUSING, BY THE LEARNING DEVICE, AN I-TH RESIDUAL FEATURE AND THE I-TH TEMPORARY FEATURE, TO THEREBY GENERATE AN I-TH FUSION FEATURE, WHEREIN THE I-TH RESIDUAL FEATURE IS EXTRACTED FROM THE I-TH TEMPORARY FEATURE FOR THE SPECIFIC TASK, AND (4) APPLYING, BY THE LEARNING DEVICE, A LEARNING OPERATION TO A K-TH FUSION FEATURE THROUGH THE TASK HEAD BLOCK TO THEREBY GENERATE A TASK OUTPUT, WHEREIN THE K-TH FUSION FEATURE IS OUTPUTTED FROM THE K-TH RESIDUAL UNIT CORRESPOND TO THE BASE MODEL

S30_2 — (1) GENERATING, BY THE LEARNING DEVICE, A TASK LOSS REFERRING TO THE TASK OUTPUT AND GROUND TRUTH CORRESPONDING TO THE TRAINING DATA, AND (2) PERFORMING, BY THE LEARNING DEVICE, A BACKPROPAGATION OF THE TASK LOSS TO TRAIN AT LEAST PART OF THE TASK HEAD BLOCK, THE FIRST RESIDUAL UNIT TO THE K-TH RESIDUAL UNIT AND THE FIRST ADAPTATION BLOCK TO THE K-TH ADAPTATION BLOCK

METHOD FOR TRAINING CUSTOM MODEL BASED ON PRE-TRAINED BASE MODEL AND LEARNING DEVICE USING THE SAME

CROSS REFERENCE OF RELATED APPLICATION

This present application claims the benefit of the earlier filing date of Japanese patent application No. 2024-185256, filed Oct. 21, 2024, the entire contents of which being incorporated herein by reference.

FIELD OF THE DISCLOSURE

The present disclosure relates to a method for training a custom model based on a pre-trained base model, and a learning device using the same.

BACKGROUND OF THE DISCLOSURE

Base models such as Grounding DINO, trained using a large quantity of training datasets, e.g., MSCOCO, Object365 and OpenImages, etc., have extensive and general knowledge. However, such base models have a disadvantage of lacking or not having detailed knowledge required for performing a specific task, e.g., a task of detecting defect of a circuit substrate. Therefore, studies on learning knowledge required for performing the specific task using relatively small amount of training data are in progress, based on the general knowledge of the base model. Conventional learning models regarding the studies are described in FIG. 1.

As one example, (a) of the FIG. 1 illustrates a learning model using a Full Fine-Tuning method. For instance, when a training data is inputted to a pre-trained base model 100 including 5 layers, (1) a learning operation is performed through a first layer 110 to a fifth layer 150 to thereby output a task data, (2) a loss is generated referring to the task data and its corresponding GT (Ground Truth), and (3) each of weight parameters of the fifth layer 150 to the first layer 110 is updated sequentially to train the base model 100 by using a backpropagation of the loss, i.e., by applying gradient operation in a backwards direction shown as a dotted arrow. Thus, the Full Fine-tuning method has an advantage of achieving a high-performance since all weight parameters of the base model 100 can be trained. However, the base model 100 having a large quantity of the weight parameters makes the Full Fine-tuning method have a disadvantage of being astronomically expensive to train the base model 100 for the specific task.

As another example, (b) and (c) of the FIG. 1 illustrates different learning models having some part of the layers of the base model 100 being frozen to overcome the disadvantage related to costs. These examples can reduce costs for training by not training frozen weight parameters. For instance, the weight parameters of the first layer 110 to a fourth layer 140 of the base model 100 are frozen in (b) and the weight parameters of the first layer 110, a third layer 130 and the fourth layer 140 of the base model 100 are frozen in (c). Herein, after the processes up to generating the loss are performed identically to (a), only the weight parameter of the fifth layer 150 is updated through the backpropagation in (b), and only the weight parameters of the fifth layer 150 and the second layer 120 are updated through backpropagation in (c). Therefore, in (b) and (c), information on only some part of the layers is required to be stored in a memory, resulting in reducing costs compared to the Full Fine-Tuning method.

However, there are problems regarding (b) and (c) as well. Basically, the base model 100 extracts primitive features from training data at a front layer (for example, the first layer 110) and performs advanced inference by using the primitive features in a back layer (for example, the fifth layer 150). In case the learning operation is not performed for the front layer like (b), the performance of the base model 100 is greatly reduced since specific primitive features for the specific task cannot be generated and thus the inference should be performed for the specific task only by using general primitive features regarding general tasks. In case the learning operation is also performed for the front layer like (c) in order to minimize the reduction of performance, advantage on the cost cannot be maintained since not only the gradient operation is applied up to the front layer and the information up to the front layer should be stored in the memory.

As another example, (d) of the FIG. 1 illustrates a learning model having all the layers in the base model 100 being frozen and having separate adaptor layers. For example, two adaptor layers, i.e., a first adaptor layer 210 and a second adaptor layer 220, may be respectively connected to outputs of the second layer 120 and a fourth layer 140 in (d), and the outputs of the first adaptor layer 210 and the second adaptor layer 220 may be fused through a fusion layer 300, and then task data is outputted through an output layer 400. Thereafter, backpropagation is performed with the loss (which is generated by referring to the task data and the corresponding GT). That is, weight parameters of the output layer 400, the first adaptor layer 210 and the second adaptor layer 220 are updated by applying the gradient operation thereon. Since the first layer 110 to the fifth layer 150 are frozen, i.e., the weight parameters of the first layer 110 to the fifth layer 150 are fixed, it has an advantage of reducing the costs spent for training. That is, the costs can be reduced by only training the output layer 400, the first adaptor layer 210 and the second adaptor layer 220 having relatively fewer weight parameters than the base model 100. But it is difficult to enhance the performance on advanced inference for the specific task by only using the adaptor layers.

Therefore, an enhanced method for solving the aforementioned problems is required.

SUMMARY OF THE DISCLOSURE

It is an object of the present disclosure to solve all the aforementioned problems.

It is another object of the present disclosure to configure a custom model including a base model having at least one pre-trained feature extraction block, at least one adaptation block, at least one residual unit, and a task head block, and update at least part of the task head block, the at least one residual unit and the at least one adaptation block through a backpropagation using a task loss, while not updating parameters of the base model.

It is still another object of the present disclosure to fuse at least one residual feature (generated through the at least one residual unit) and at least one converted feature (generated by converting the at least one intermediate feature through the at least one adaptation block), to thereby allow a learning device to achieve an advanced inference.

In accordance with one aspect of the present disclosure, there is provided a method for training a custom model based on a pre-trained base model, comprising steps of: (a)

(1) inputting, by a learning device, training data to a custom model that performs a specific task, wherein the custom model includes a base model having a pre-trained first feature extraction block to a pre-trained n-th feature extraction block, wherein n is an integer greater than or equal to 2, a first adaptation block to a k-th adaptation block, wherein k is an integer greater than or equal to 2 and less than or equal to n, a first residual unit to a k-th residual unit, and a task head block, (2) generating, by the learning device, a first intermediate feature to an n-th intermediate feature through each of the pre-trained first feature extraction block to the pre-trained n-th feature extraction block of the base model, and (3) selecting, by the learning device, a first specific intermediate feature to a k-th specific intermediate feature respectively among the first intermediate feature to the n-th intermediate feature, and converting, by the learning device, source domains of the first specific intermediate feature to the k-th specific intermediate feature respectively to target domains corresponding to the specific task through the first adaptation block to the k-th adaptation block respectively, to thereby generate a first converted feature to a k-th converted feature respectively, wherein the source domains correspond to the base model; (b) (1) fusing, by the learning device, a first residual feature and the first converted feature through the first residual unit, to thereby generate a first fusion feature, wherein the first residual feature is extracted from the first converted feature for the specific task, (2) fusing, by the learning device, an (i−1)-th fusion feature and an i-th converted feature, to thereby generate an i-th temporary feature, wherein i is an integer greater than or equal to 2 and less than or equal to k, (3) fusing, by the learning device, an i-th residual feature and the i-th temporary feature, to thereby generate an i-th fusion feature, wherein the i-th residual feature is extracted from the i-th temporary feature for the specific task, and (4) applying, by the learning device, a learning operation to a k-th fusion feature through the task head block to thereby generate a task output, wherein the k-th fusion feature is outputted from the k-th residual unit; and (c) (1) generating, by the learning device, a task loss referring to the task output and Ground Truth corresponding to the training data, and (2) performing, by the learning device, a backpropagation of the task loss to train at least part of the task head block, the first residual unit to the k-th residual unit and the first adaptation block to the k-th adaptation block.

As one example, at the step of (a), (1) the learning device selects the n-th intermediate feature or an (n−1)-th intermediate feature among the first intermediate feature to the n-th intermediate feature and converts the source domains to the target domains, through an adaptation block among the first adaptation block to the k-th adaptation block, to thereby generate a converted feature, and (2) the learning device selects an intermediate feature among a second intermediate feature to an (n−2)-th intermediate feature and converts the source domains to the target domains, through another adaptation block among the first adaptation block to the k-th adaptation block, to thereby generate another converted feature.

As another example, at the step of (a), each of the first residual unit to the k-th residual unit is configured to have multiple convolution layers, and wherein a first filter contained in at least part of the multiple convolution layers is disassembled to multiple second filters, wherein the multiple second filters have a lower rank than the first filter.

As another example, at the step of (a), each of the pre-trained first feature extraction block to the pre-trained n-th feature extraction block has parameters which are fixed through freezing, wherein, at the step of (c), when the backpropagation of the task loss is performed, the learning device does not update the parameters of each of the pre-trained first feature extraction block to the pre-trained n-th feature extraction block.

As another example, at the step of (b), (1) the learning device applies an add operation to the first residual feature and the first converted feature through a first element-wise add layer, to thereby generate the first fusion feature, (2) the learning device applies an add operation to the i-th converted feature and the (i−1)-th fusion feature through an (i−1)-th element-wise add layer, to thereby generate the i-th temporary feature, and (3) the learning device applies an add operation to the i-th residual feature and the i-th temporary feature through an i-th element-wise add layer, to thereby generate the i-th fusion feature.

In accordance with another aspect of the present disclosure, there is provided a method for training a custom model based on a pre-trained base model, comprising steps of: (a) (1) inputting, by a learning device, training data to a custom model that performs a specific task, wherein the custom model includes a base model, an adaptation block, a residual unit, and a task head block, wherein n is an integer greater than or equal to 1, and wherein the base model has a pre-trained first feature extraction block to a pre-trained n-th feature extraction block, (2) generating, by the learning device, a first intermediate feature to an n-th intermediate feature through each of the pre-trained first feature extraction block to the pre-trained n-th feature extraction block of the base model, and (3) selecting, by the learning device, a specific intermediate feature among the first intermediate feature to the n-th intermediate feature, and converting, by the learning device, source domains of the specific intermediate feature to target domains corresponding to the specific task through the adaptation block, to thereby generate a converted feature, wherein the source domains correspond to the base model; (b) (1) fusing, by the learning device, a residual feature and the converted feature through the residual unit, to thereby generate a fusion feature, wherein the residual feature is extracted from the converted feature for the specific task, and (2) applying, by the learning device, a learning operation to the fusion feature through the task head block to thereby generate a task output; and (c) (1) generating, by the learning device, a task loss referring to the task output and Ground Truth corresponding to the training data, and (2) performing, by the learning device, a backpropagation of the task loss to train at least part of the task head block, the residual unit and the adaptation block.

As another example, at the step of (a), (1) the learning device selects a second intermediate feature or an (n−1)-th intermediate feature and converts the source domains to the target domains, through the adaptation block, to thereby generate the converted feature.

As another example, at the step of (a), the residual unit is configured to have multiple convolution layers, and a first filter contained in at least part of the multiple convolution layers is disassembled to multiple second filters, wherein the multiple second filters have a lower rank than the first filter.

As another example, at the step of (a), each of the pre-trained first feature extraction block to the pre-trained n-th feature extraction block has parameters which are fixed through freezing, wherein, at the step of (c), when the backpropagation of the task loss is performed, the learning device does not update the parameters of each of the pre-trained first feature extraction block to the pre-trained n-th feature extraction block.

As another example, at the step of (b), the learning device applies an add operation to the residual feature and the converted feature through an element-wise add layer, to thereby generate the fusion feature.

In accordance with still another aspect of the present disclosure, there is provided a learning device for training a custom model based on a pre-trained base model, comprising: at least one memory that stores instructions; and at least one processor configured to execute the instructions to perform processes of: (I) (1) inputting training data to a custom model that performs a specific task, wherein the custom model includes a base model having a pre-trained first feature extraction block to a pre-trained n-th feature extraction block, wherein n is an integer greater than or equal to 2, a first adaptation block to a k-th adaptation block, wherein k is an integer greater than or equal to 2 and less than or equal to n, a first residual unit to a k-th residual unit, and a task head block, (2) generating a first intermediate feature to an n-th intermediate feature through each of the pre-trained first feature extraction block to the pre-trained n-th feature extraction block of the base model, and (3) selecting a first specific intermediate feature to a k-th specific intermediate feature respectively among the first intermediate feature to the n-th intermediate feature, and converting source domains of the first specific intermediate feature to the k-th specific intermediate feature respectively to target domains corresponding to the specific task through the first adaptation block to the k-th adaptation block respectively, to thereby generate a first converted feature to a k-th converted feature respectively, wherein the source domains correspond to the base model; (II) (1) fusing a first residual feature and the first converted feature through the first residual unit, to thereby generate a first fusion feature, wherein the first residual feature is extracted from the first converted feature for the specific task, (2) fusing an (i−1)-th fusion feature and an i-th converted feature, to thereby generate an i-th temporary feature, wherein i is an integer greater than or equal to 2 and less than or equal to k, (3) fusing an i-th residual feature and the i-th temporary feature, to thereby generate an i-th fusion feature, wherein the i-th residual feature is extracted from the i-th temporary feature for the specific task, and (4) applying a learning operation to a k-th fusion feature through the task head block to thereby generate a task output, wherein the k-th fusion feature is outputted from the k-th residual unit; and (III) (1) generating a task loss referring to the task output and Ground Truth corresponding to the training data, and (2) performing a backpropagation of the task loss to train at least part of the task head block, the first residual unit to the k-th residual unit and the first adaptation block to the k-th adaptation block.

As another example, at the process of (I), (1) the processor selects the n-th intermediate feature or an (n−1)-th intermediate feature among the first intermediate feature to the n-th intermediate feature and converts the source domains to the target domains, through an adaptation block among the first adaptation block to the k-th adaptation block, to thereby generate a converted feature, and (2) the processor selects an intermediate feature among a second intermediate feature to an (n−2)-th intermediate feature and converts the source domains to the target domains, through another adaptation block among the first adaptation block to the k-th adaptation block, to thereby generate another converted feature.

As another example, at the process of (I), each of the first residual unit to the k-th residual unit is configured to have multiple convolution layers, and wherein a first filter contained in at least part of the multiple convolution layers is disassembled to multiple second filters, wherein the multiple second filters have a lower rank than the first filter.

As another example, at the process of (I), each of the pre-trained first feature extraction block to the pre-trained n-th feature extraction block has parameters which are fixed through freezing, wherein, at the process of (III), when the backpropagation of the task loss is performed, the processor does not update the parameters of each of the pre-trained first feature extraction block to the pre-trained n-th feature extraction block.

As another example, at the process of (II), (1) the processor applies an add operation to the first residual feature and the first converted feature through a first element-wise add layer, to thereby generate the first fusion feature, (2) the processor applies an add operation to the i-th converted feature and the (i−1)-th fusion feature through an (i−1)-th element-wise add layer, to thereby generate the i-th temporary feature, and (3) the processor applies an add operation to the i-th residual feature and the i-th temporary feature through an i-th element-wise add layer, to thereby generate the i-th fusion feature.

In accordance with still yet another aspect of the present disclosure, there is provided a learning device for training a custom model based on a pre-trained base model, comprising: at least one memory that stores instructions; and at least one processor configured to execute the instructions to perform processes of: (I) (1) inputting training data to a custom model that performs a specific task, wherein the custom model includes a base model, an adaptation block, a residual unit, and a task head block, wherein n is an integer greater than or equal to 1, and wherein the base model has a pre-trained first feature extraction block to a pre-trained n-th feature extraction block, (2) generating a first intermediate feature to an n-th intermediate feature through each of the pre-trained first feature extraction block to the pre-trained n-th feature extraction block of the base model, and (3) selecting a specific intermediate feature among the first intermediate feature to the n-th intermediate feature, and converting source domains of the specific intermediate feature to target domains corresponding to the specific task through the adaptation block, to thereby generate a converted feature, wherein the source domains correspond to the base model; (II) (1) fusing a residual feature and the converted feature through the residual unit, to thereby generate a fusion feature, wherein the residual feature is extracted from the converted feature for the specific task, and (2) applying a learning operation to the fusion feature through the task head block to thereby generate a task output; and (III) (1) generating a task loss referring to the task output and Ground Truth corresponding to the training data, and (2) performing a backpropagation of the task loss to train at least part of the task head block, the residual unit and the adaptation block.

As another example, at the process of (I), (1) the processor selects a second intermediate feature or an (n−1)-th intermediate feature and converts the source domains to the target domains, through the adaptation block, to thereby generate the converted feature.

As another example, at the process of (I), the residual unit is configured to have multiple convolution layers, and a first filter contained in at least part of the multiple convolution layers is disassembled to multiple second filters, wherein the multiple second filters have a lower rank than the first filter.

As another example, at the process of (I), each of the pre-trained first feature extraction block to the pre-trained n-th feature extraction block has parameters which are fixed through freezing, wherein, at the process of (III), when the backpropagation of the task loss is performed, the processor does not update the parameters of each of the pre-trained first feature extraction block to the pre-trained n-th feature extraction block.

As another example, at the process of (II), the processor applies an add operation to the residual feature and the converted feature through an element-wise add layer, to thereby generate the fusion feature.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

FIG. 3 is a flow diagram schematically illustrating a process of training the custom model based on the pre-trained base model in accordance with one example embodiment of the present disclosure.

FIG. 5 is a flow diagram schematically illustrating a process of training a custom model based on a pre-trained base model in accordance with another example embodiment of the present disclosure.

DETAILED DESCRIPTION OF THE PREFERRED EMBODIMENTS

Figure 1:
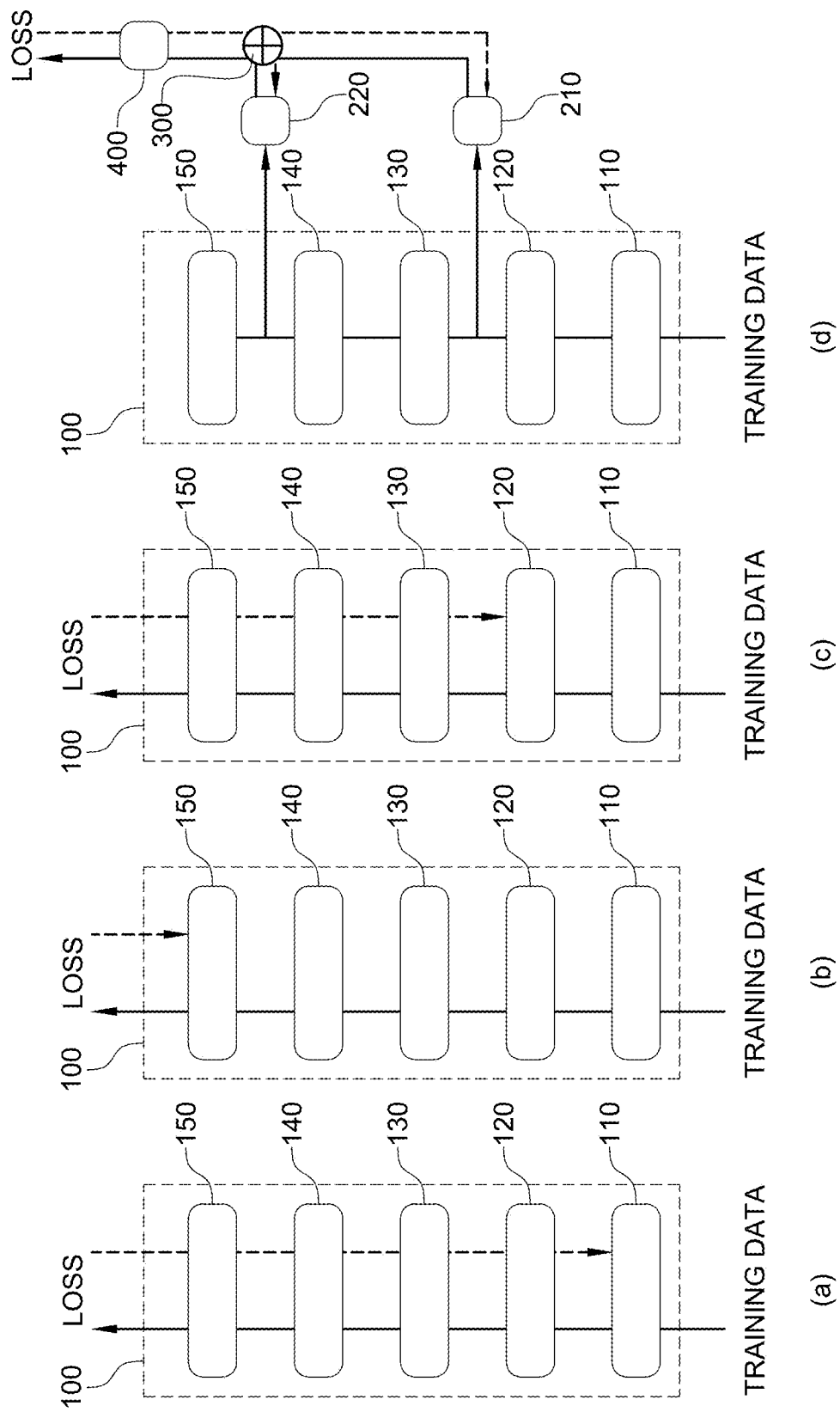
FIG. 1 is a drawing schematically illustrating a conventional learning model for performing a specific task based on a pre-trained base model.

In the following detailed description, reference is made to the accompanying drawings that show, by way of illustration, specific embodiments in which the invention may be practiced. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

Figure 2:
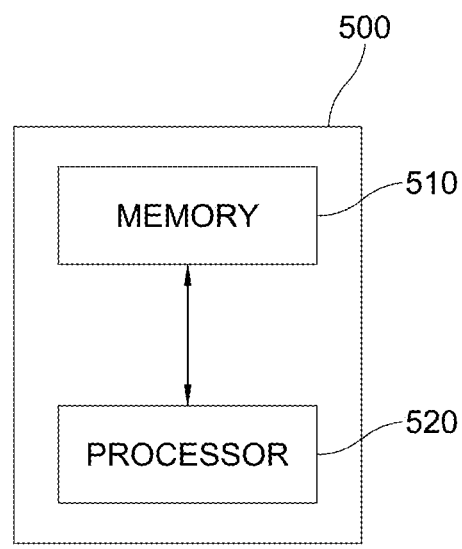
FIG. 2 is a drawing schematically illustrating a learning device for training a custom model based on the pre-trained base model in accordance with one example embodiment of the present disclosure.

FIG. 2 is a drawing schematically illustrating a learning device for training a custom model based on the pre-trained base model in accordance with one example embodiment of the present disclosure.

Referring to FIG. 2, a learning device 500 may include a memory 510 that stores instructions for training the custom model based on the pre-trained base model and a processor 520 configured to perform operations for training the custom model based on the pre-trained base model. Herein, the learning device 500 may include various computing devices, such as a server, a PC, a laptop, a workstation, a tablet computer, a mobile computer, a PDA/EDA, a mobile phone, a smartphone, an IoT device, etc.

Specifically, the learning device 500 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, a case in which the computing device includes an integrated processor having a medium, a processor and a memory therein is not excluded.

FIG. 3 is a flow diagram schematically illustrating a process of training the custom model based on the pre-trained base model in accordance with one example embodiment of the present disclosure.

Firstly, the learning device 500 includes the custom model capable of performing a specific task. Herein, the custom model includes: the base model in which a pre-trained first feature extraction block to a pre-trained n-th feature extraction block are contained, an adaptation block, a residual unit, and a task head block. The learning device 500 inputs training data to the custom model, to thereby instruct the custom model to generate a first intermediate feature to an n-th intermediate feature through each of the pre-trained first feature extraction block to the pre-trained n-th feature extraction block of the base model. Thereafter, the learning device 500 selects a specific intermediate feature among the first intermediate feature to the n-th intermediate feature, and converts source domains of the specific intermediate feature to target domains corresponding to the specific task through the adaptation block, to thereby generate a converted feature, wherein the source domains correspond to the base model at a step of S10_1. Herein, n may be an integer greater than or equal to 1, but generally, n may be considered as an integer greater than or equal to 2.

For your reference, the custom model including one adaptation block and one residual unit, which is a minimum configuration implementable as an embodiment, will be explained by referring to FIGS. 3 and 4. On the other hand, as another embodiment for training advanced inferences, the custom model including multiple adaptation blocks and multiple residual units will be explained by referring to FIGS. 5 to 7.

For instance, Grounding DINO, which is pre-trained by using various training datasets, e.g., MSCOCO, Object365 and OpenImages, etc., can be used as the base model. However, any base model pre-trained with a large quantity of training datasets may be used as the base model as well.

Also, in case the training data is inputted to the base model, each of the first intermediate feature to the n-th intermediate feature respectively is generated at each of the first feature extraction block to the n-th extraction block of the base model. But, since the present embodiment only uses one adaptation block, the specific intermediate feature selected among the first intermediate feature to the n-th intermediate feature is inputted to the adaptation block, and then Down-Projection and Up-Projection are sequentially applied to the specific intermediate feature through the adaptation block, resulting in a conversion of the source domains to the target domains, i.e., a generation of the converted feature.

Then, the learning device 500 fuses a residual feature and the converted feature through the residual unit, to thereby generate a fusion feature, and applies a learning operation to the fusion feature through the task head block to thereby generate a task output at a step of S20_1. Herein the residual feature is extracted from the converted feature for the specific task.

That is, in case the converted feature is inputted to the residual unit, the learning operation is performed through multiple convolution layers included in the residual unit to generate the residual feature, and the converted feature, transmitted through a skip connection in the residual unit, can be fused with the residual feature, to thereby generate the fusion feature. Further, fusing the features may be performed through a separate fusion layer capable of performing add operation, concatenation operation, weight sum operation etc., but not limited thereto.

Thereafter, the learning device 500 generates a task loss referring to the task output and Ground Truth corresponding to the training data, and performs a backpropagation of the task loss to train at least part of the task head block, the residual unit and the adaptation block at a step of S30_1.

Figure 4:
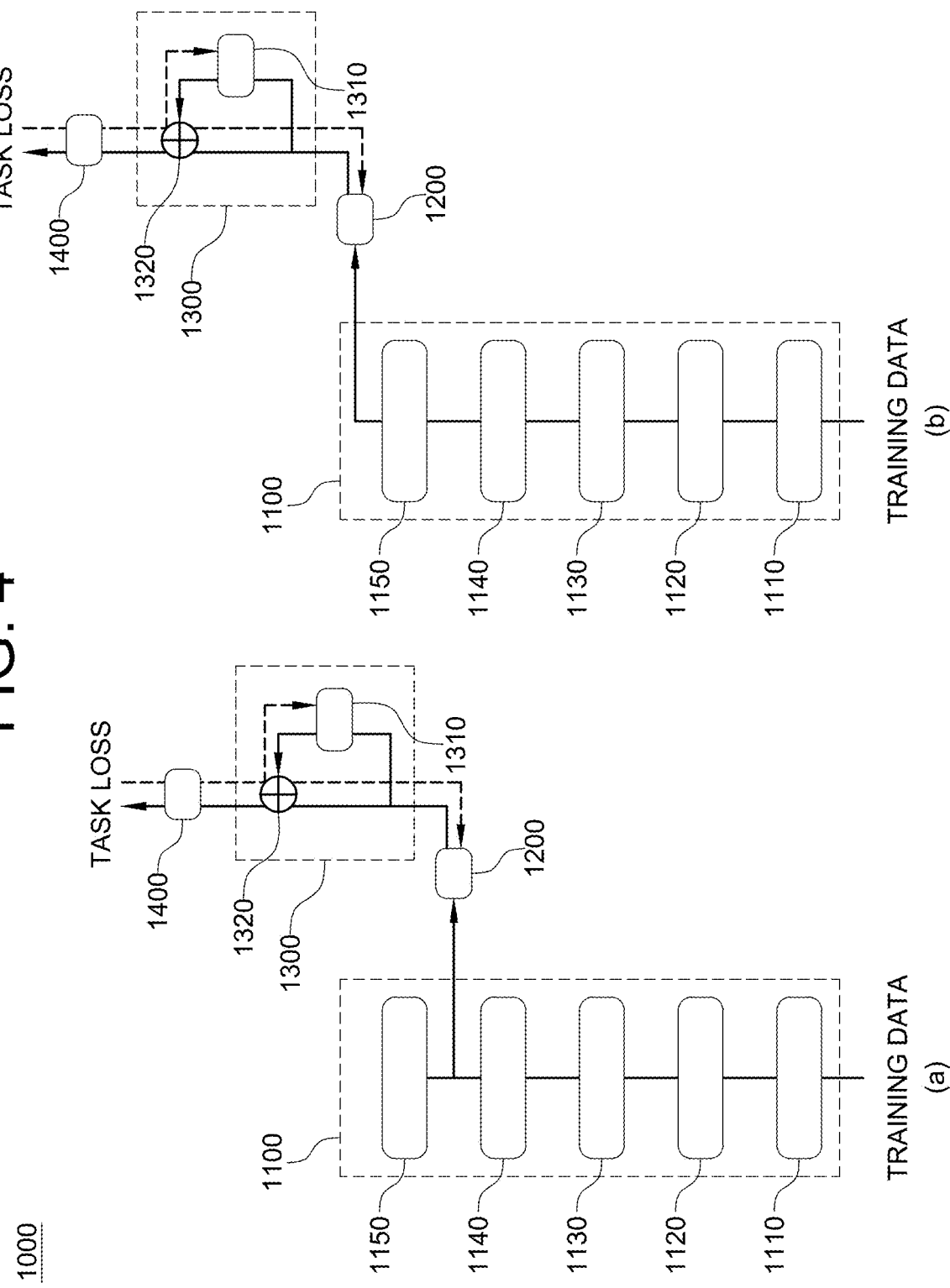
FIG. 4 is a drawing schematically illustrating the custom model including an adaptation block and a residual unit in accordance with one example embodiment of the present disclosure.

More specific explanation on the processes of training the custom model including one adaptation block and one residual unit will follow by referring to FIG. 4.

FIG. 4 is a drawing schematically illustrating the custom model including the one adaptation block and the one residual unit in accordance with one example embodiment of the present disclosure.

Herein, (a) and (b) of FIG. 4 both illustrate examples of a custom model 1000 including a base model 1100, one adaptation block 1200, one residual unit 1300 and a task head block 1400. Processes for training the custom model 1000 would be explained by referring to (a), and description of the difference between (a) and (b) will follow. For reference, although the base model included in the custom model explained in the examples of FIGS. 4, 6 and 7 includes 5 feature extraction blocks, this can be generalized such that the base model has n feature extraction blocks in actual cases.

Firstly, for example, the learning device 500 inputs training data in a form of image data to the pre-trained base model 1100 in order to perform a specific task such as detecting defect of a circuit substrate, and then allows the base model 1100 to perform learning operation through each of a pre-trained first feature extraction block 1110 to a pre-trained fifth feature extraction block 1150 to thereby generate a first intermediate feature to a fifth intermediate feature through each of the pre-trained first feature extraction block 1110 to the pre-trained fifth feature extraction block 1150. Herein, each of the pre-trained first feature extraction block 1110 to the pre-trained fifth feature extraction block 1150 may be frozen in order to prevent parameters thereof from being updated, while the backpropagation is performed through the gradient operation. Further, although FIG. 4 illustrates the base model 1100 having the 5 pre-trained feature extraction blocks for convenience, if the base model 1100 is generalized to have n pre-trained feature extraction blocks, each of the first intermediate feature to the n-th intermediate feature may be generated through each of the pre-trained first feature extraction block to the pre-trained n-th feature extraction block.

Also, since both (a) and (b) of FIG. 4 includes one adaptation block 1200, the learning device 500 may select a specific intermediate feature among the first intermediate feature to the fifth intermediate feature and then allow the specific intermediate feature to be inputted to the adaptation block 1200. Thereafter, the learning device 500 may perform Up-projection operation and Down-Projection operation sequentially on the specific intermediate feature through the adaptation block 1200, to thereby convert the source domains of the specific intermediate feature corresponding to the base model 1100 to the target domains corresponding to the specific task of the task head block 1400, i.e., generate the converted feature. Herein, in case the specific intermediate feature is selected among the pre-trained first feature extraction block 1110 to the pre-trained fifth feature extraction block 1150, since the first intermediate feature generated through the pre-trained first feature extraction block 1110 has a higher probability of being a primitive feature having general knowledge rather than the feature extracted for the specific task, the first intermediate feature may not be selected as the specific intermediate feature, and since the fifth intermediate feature generated through the pre-trained fifth feature extraction block 1150 corresponds to a feature outputted through a configuration described in (b) of FIG. 1, i.e., since the fifth intermediate feature has little advantage, the fifth intermediate feature may not be selected as the specific intermediate feature as well.

In other words, in case the base model 1100 includes the pre-trained first feature extraction block to the pre-trained n-th feature extraction block, the learning device 500 may select the specific intermediate feature among the second intermediate feature to the (n−1)-th intermediate feature generated through a pre-trained second feature extraction block to a pre-trained (n−1)-th feature extraction block, and then input the specific intermediate feature to the adaptation block 1200.

And, the learning device 500 may input the converted feature generated through the adaptation block 1200 to the residual unit 1300, to thereby (i) generate the residual feature through the residual block 1310 included in the residual unit 1300 and input the residual feature to the fusion layer 1320, and at the same time (ii) input the converted feature generated through the adaptation block 1200 to the fusion layer 1320 included in the residual unit 1300 by using the skip configuration included in the residual unit 1300. Then, the fusion layer 1320 can fuse the residual feature and the converted feature to thereby generate the fusion feature. Herein, the residual block 1310 includes multiple convolution layers capable of performing convolution operations sequentially on the converted feature to generate the residual feature. Further, the fusion layer 1320 may apply an add operation, a concatenation operation, a weight sum operation etc. as a method for fusing the features. It is understood that an element-wise add layer 1320 is used as the fusion layer to perform the add operation in FIG. 4.

On the other hand, in case additional cost reduction is needed to train the custom model 1000, rank of the residual unit 1300, more specifically, at least part of ranks in the multiple convolution layers included in the residual block 1310 may be configured as low-ranks to decrease the number of parameters required for training. Specifically, a first filter having a full-rank included in each of the multiple convolution layers may be configured to be disassembled to multiple second filters having a lower rank than the first filter. For instance, in case the first filter has a d×k matrix, the first filter may be disassembled to two second filters having a d×r matrix and a r×k matrix, wherein r is rank. For example, in a matrix with d=10, k=10 with r=3, the first filter with 10×10 requires training for 100 parameters, while the second filters with 10×3 and 3×10 require training for only 60 parameters. Thus, the residual block 1310 can be configured as a low-rank, which results in a reduction of the cost for training the custom model 1000. Although the description above only mentions cases in which the first filter is in a form of a 2D matrix, even in case the first filter is in a form of a 3D tensor, the same method of disassembling the first filter to the multiple second filters can be used as well. Of course, if needed, those skilled in the art may achieve the additional reduction of cost by configuring the adaptation block 1200 with a low-rank as well.

Thereafter, the learning device 500 may input the fusion feature to the task head block 1400, to thereby allow the task head block 1400 to output the task output. For example, if the specific task is related to image classification, the task head block 1400 may be configured as one or more FC (Fully-connected) layers, and if the specific task is related to object detection, the task head block 1400 may be configured as one or more pooling layers and one or more FC layers.

Also, the learning device 500 generates a task loss referring to the task output and Ground Truth (GT) corresponding to the training data, and performs a backpropagation, whose direction is indicated as a dotted arrow, of the task loss to update the parameters of at least part of the task head block 1400, the residual unit 1300 and the adaptation block 1200. Herein, since the pre-trained first feature extraction block to the pre-trained n-th feature extraction block, e.g., the pre-trained first feature extraction block 1110 to the pre-trained fifth feature extraction block 1150 in FIG. 4, of the base model 1100 are already frozen to fix the parameters, parameters of the pre-trained first feature extraction block to the pre-trained n-th feature extraction block of the base model 1100 are not updated. Thus, since the base model 1100 is not additionally trained, the cost for training is decreased compared to the conventional Full Fine-tuning method, while the advanced inferences can be realized by fusing the features generated from the adaptation block 1200 and those generated from the residual unit 1300. Accordingly, the learning performance for the specific task can be achieved.

On the other hand, although (a) and (b) of FIG. 4 are similar in their basic configuration of the custom model 1000, (a) and (b) of FIG. 4 are different with each other in that (a) of FIG. 4 selects, as the specific intermediate feature, the fourth intermediate feature generated through the pre-trained fourth feature extraction block 1140 of the base model 1100 and then inputs the fourth intermediate feature to the adaptation block 1200, while (b) of FIG. 4 selects, as the specific intermediate feature, the fifth intermediate feature generated through the pre-trained fifth feature extraction block 1150 of the base model 1100 to thereby input the fifth intermediate feature to the adaptation block 1200. That is, a configuration of (b) of FIG. 4 in which an output of the last pre-trained feature extraction block of the base model 1100 is inputted to the adaptation block 1200 is similar to a configuration of (b) of FIG. 1, and thus the configuration of (b) of FIG. 4 does not have substantial advantages. Accordingly, for cases with minimal configurations for the custom model 1000, it is more preferable to use one of the pre-trained feature extraction blocks excluding the first pre-trained feature extraction block and the last pre-trained feature extraction block, similar to (a) of FIG. 4.

The minimally configured embodiment is described above, and configurations of the custom model including multiple adaptation blocks and multiple residual units will be described with reference to FIGS. 5 to 7.

FIG. 5 is a flow diagram schematically illustrating a process of training the custom model based on the pre-trained base model in accordance with another example embodiment of the present disclosure.

Firstly, the learning device 500 includes the custom model capable of performing the specific task. Herein, the custom model includes: the base model in which the pre-trained first feature extraction block to the pre-trained n-th feature extraction block are contained, a first adaptation block to a k-th adaptation block, a first residual unit to a k-th residual unit, and the task head block. The learning device 500 inputs training data to the custom model, to thereby instruct the custom model to generate the first intermediate feature to the n-th intermediate feature through each of the pre-trained first feature extraction block to the pre-trained n-th feature extraction block of the base model. Thereafter, the learning device 500 selects a first specific intermediate feature to a k-th specific intermediate feature among the first intermediate feature to the n-th intermediate feature, and converts the source domains of the first specific intermediate feature to the k-th specific intermediate feature to the target domains corresponding to the specific task, through each of the first adaptation block to the k-th adaptation block, to thereby generate a first converted feature to a k-th converted feature, wherein the source domains correspond to the base model at a step of S10_2. Herein, n may be an integer greater than or equal to 2, and k may be an integer greater than or equal to 2 and less than or equal to n.

Figure 6:
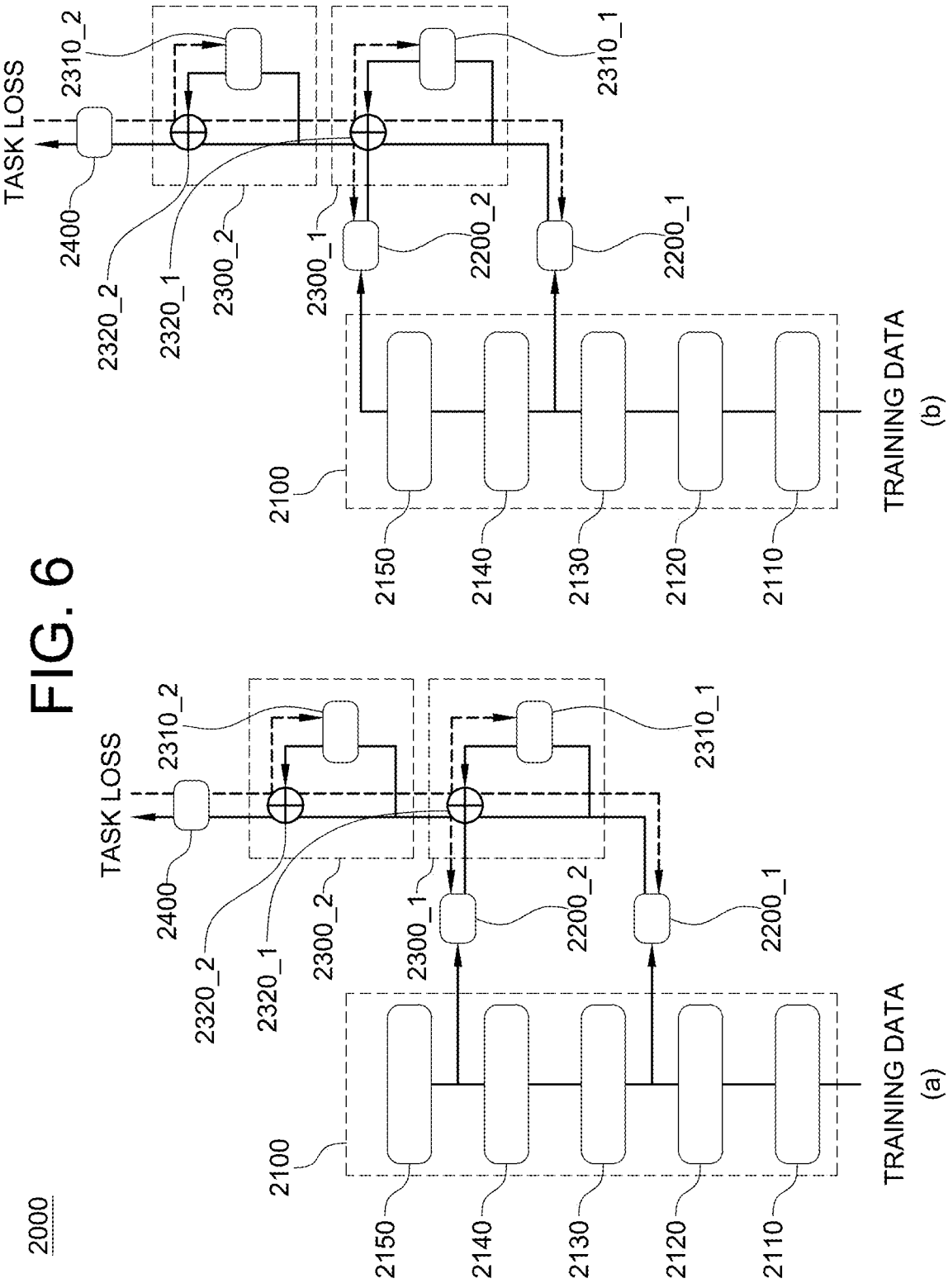
FIG. 6 is a drawing schematically illustrating a custom model including two adaptation blocks and two residual units in accordance with another example embodiment of the present disclosure.
Figure 7:
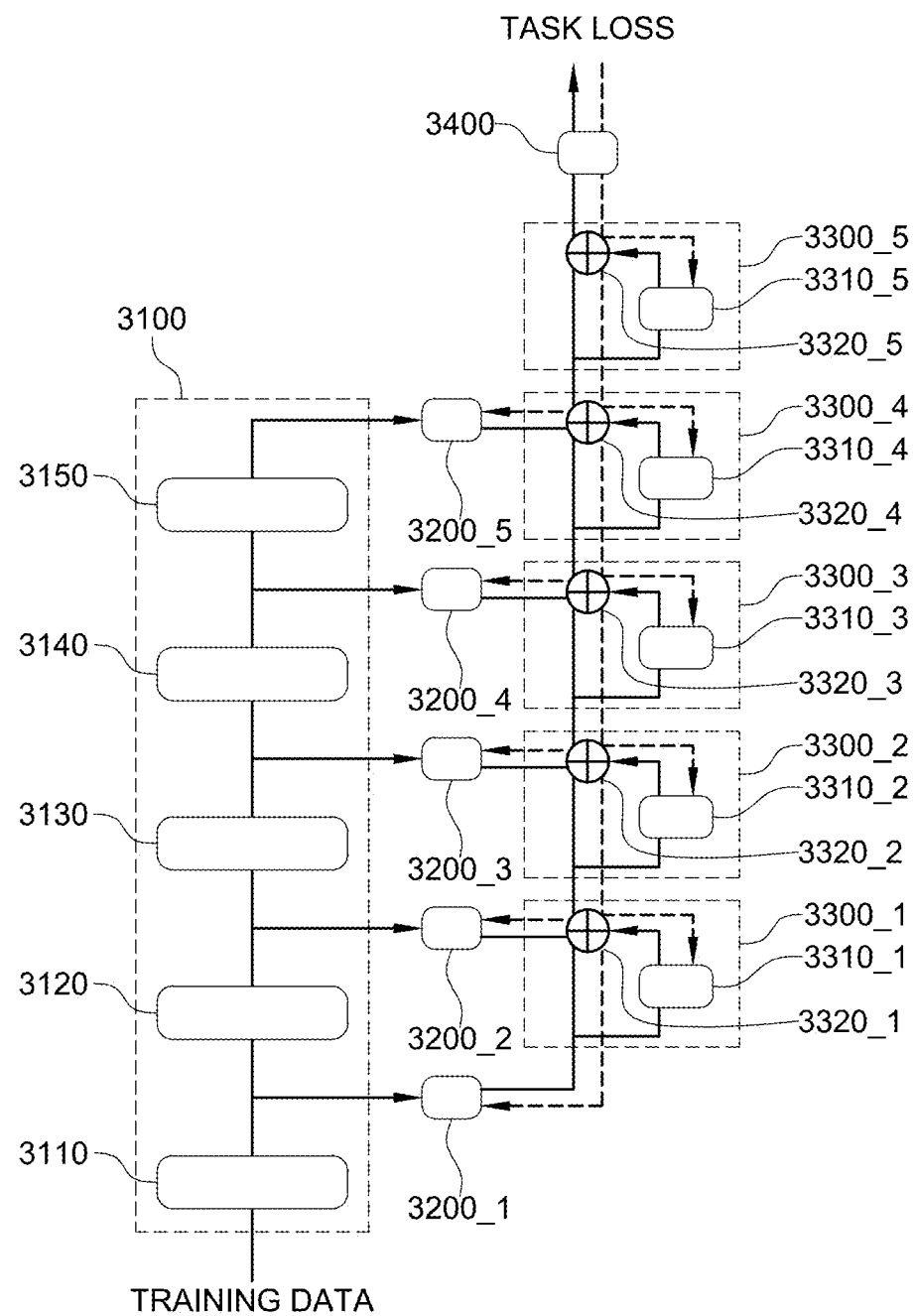
FIG. 7 is a drawing schematically illustrating a custom model including the maximum number of adaptation blocks and the maximum number of residual units in accordance with still another example embodiment of the present disclosure.

For your reference, custom models illustrated in FIGS. 6 and 7 are different from the custom model illustrated in FIG. 4. A custom model including two adaptation blocks and two residual units will be explained by referring to FIG. 6, and a custom model including the maximum number of the adaptation blocks and the maximum number of the residual units to train the most advanced inferences will be explained by referring to FIG. 7.

Also, in case the training data is inputted to the base model, each of the first intermediate feature to the n-th intermediate feature is generated at each of the first feature extraction block to the n-th extraction block of the base model. But, since the number of the adaptation blocks is k (k<=n), i.e., since there are the first adaptation block to the k-th adaptation block, the learning device 500 selects k specific intermediate features, i.e., the first specific intermediate feature to the k-th specific intermediate feature, among the first intermediate feature to the n-th intermediate feature, and then inputs each of the k specific intermediate features to each of the first adaptation block to the k-th adaptation block, to thereby instruct each of the first adaptation block to the k-th adaptation block to apply Down-Projection and Up-Projection sequentially to each of the first specific intermediate feature to the k-th specific intermediate feature and thus to convert the source domains, corresponding to each of the first specific intermediate feature to the k-th specific intermediate feature of the base model, to the target domains, resulting in a generation of a first converted feature to a k-th converted feature.

Then, the learning device 500 (1) fuses a first residual feature and the first converted feature through the first residual unit, to thereby generate a first fusion feature, wherein the first residual feature is extracted from the first converted feature for the specific task, (2) fuses an (i−1)-th fusion feature and an i-th converted feature, to thereby generate an i-th temporary feature, (3) repeatedly fuses an i-th residual feature and the i-th temporary feature, to thereby generate an i-th fusion feature, wherein the i-th residual feature is extracted from the i-th temporary feature for the specific task, and then (4) apply the learning operation to a k-th fusion feature outputted from the k-th residual unit through the task head block to thereby generate a task output at a step of S20_2. Herein, i may be an integer greater than or equal to 2 and less than or equal to k.

That is, the learning device 500 inputs the first converted feature to the first residual unit, and allows the first residual unit to perform the learning operation on the first converted feature through the multiple convolution layers included in the first residual unit to thereby generate the first residual feature. Then, the learning device 500 allows the first converted feature, transmitted through a skip connection in the first residual unit, to be fused with the first residual feature, to thereby generate the first fusion feature. That is, the processes up to generating the first fusion feature can be performed identically to FIG. 4.

Considering that the learning processes for the second residual unit to the k-th residual unit are identical, and i is an integer greater than or equal to 2 and less than or equal to k, the learning processes for the i-th residual unit can be generalized as follows. The learning device 500 (1) firstly performs the process of generating the i-th temporary feature by fusing the i-th converted feature and the (i−1)-th fusion feature through the (i−1)-th residual unit, (2) performs the learning operation on the i-th temporary feature through the multiple convolution layers included in the i-th residual unit, to thereby generate the i-th residual feature, and (3) fuses the i-th temporary feature and the i-th residual feature, to thereby generate the i-th fusion feature, wherein the i-th temporary feature is transmitted through the skip connection in the i-th residual unit. Consequently, these processes may be repeated until the k-th fusion feature is outputted from the k-th residual unit. Herein, the features may be fused through a separate fusion layer capable of performing at least one of add operation, concatenation operation, weight sum operation etc. Furthermore, the fusion layer, which applies the fusion operation to generate the i-th temporary feature, may be a fusion layer included in the (i−1)-th residual unit, or a separate fusion layer disposed between the (i−1)-th residual unit and the i-th residual unit, but it is not limited thereto. However, for simplicity of explanation, we will assume that the fusion layer for applying the fusion operation to generate the i-th temporary feature is included in the first (i−1)-th residual unit.

Thereafter, the learning device 500 generates a task loss by referring to the task output and Ground Truth corresponding to the training data, and performs a backpropagation of the task loss to train at least part of the task head block, the residual units and the adaptation blocks at a step of S30_2.

More specific explanation on the processes of training custom models including at least two adaptation blocks and at least two residual units will follow by referring FIGS. 6 and 7.

FIG. 6 is a drawing schematically illustrating a custom model including two adaptation blocks and two residual units in accordance with another example embodiment of the present disclosure.

Herein, (a) and (b) of FIG. 6 both illustrate examples of a custom model 2000 including a base model 2100, a first adaptation block 2200_1, a second adaptation block 2200_2, a first residual unit 2300_1, a second residual unit 2300_2 and a task head block 2400. Processes for training the custom model 2000 would be explained by referring to (a) of FIG. 6, and explanation on the difference between (a) and (b) will follow.

Firstly, for example, the learning device 500 inputs training data in a form of image data to the pre-trained base model 2100 in order to perform a specific task such as detecting defect of a circuit substrate, and allows the base model 2100 to perform learning operation through each of a pre-trained first feature extraction block 2110 to a pre-trained fifth feature extraction block 2150 sequentially to thereby generate a first intermediate feature to a fifth intermediate feature. Herein, each of the pre-trained first feature extraction block 2110 to the pre-trained fifth feature extraction block 2150 may be frozen in order to prevent the parameters thereof from being updated, while the backpropagation is performed through the gradient operation. Further, although FIG. 6 illustrates the base model 2100 having 5 pre-trained feature extraction blocks for convenience, if the base model 2100 is generalized to have n pre-trained feature extraction blocks, each of the first intermediate feature to the n-th intermediate feature may be generated through each of the pre-trained first feature extraction block to the pre-trained n-th feature extraction block.

Also, since both (a) and (b) of FIG. 6 includes the first adaptation block 2200_1 and the second adaptation block 2200_2, the learning device 500 may select one intermediate feature, among the first intermediate feature to the fifth intermediate feature, as the first specific intermediate feature to be inputted to the first adaptation block 2200_1, and select another intermediate feature, among the first intermediate feature to the fifth intermediate feature, as a second specific intermediate feature to be inputted to the second adaptation block 2200_2. Herein, since the first intermediate feature generated through the pre-trained first feature extraction block 2110 of the base model 2100 may have overly generic knowledge, the learning device 500 may select the first specific intermediate feature and the second specific intermediate feature among the second intermediate feature and the fifth intermediate feature generated respectively through the pre-trained second feature extraction block 2120 to the pre-trained fifth feature extraction block 2150, excluding the pre-trained first feature extraction block 2110. Further, the first specific intermediate feature may be selected from one of middle pre-trained feature extraction blocks (for example, the pre-trained second feature extraction block 2120 and the pre-trained third feature extraction block 2130), and the second specific intermediate feature may be selected from one of back pre-trained feature extraction blocks (for example, the pre-trained fourth feature extraction block 2140 and the pre-trained fifth feature extraction block 2150), to thereby reflect relatively general knowledge and relatively detailed knowledge corresponding to the specific task, which leads to the advanced references.

This may be generalized such as the base model 2100 including the pre-trained first feature extraction block to the pre-trained n-th feature extraction block as follows. The learning device 500 may (1) select one of the second intermediate feature to the (n−2)-th intermediate feature generated through the pre-trained second feature extraction block to the pre-trained (n−2)-th feature extraction block as the first specific intermediate feature to be inputted to the first adaptation block 2200_1, (2) select one of the (n−1)-th intermediate feature and the n-th intermediate feature generated through the pre-trained (n−1)-th feature extraction block and the pre-trained n-th feature extraction block as the second specific intermediate feature to be inputted to the second adaptation block 2200_2. For instance, (a) of FIG. 6 may be an example in which the second intermediate feature is selected as the first specific intermediate feature and the fourth intermediate feature is selected as the second specific intermediate feature, and (b) of FIG. 6 may be an example in which the third intermediate feature is selected as the first specific intermediate feature and the fifth intermediate feature is selected as the second specific intermediate feature.

Thereafter, the learning device 500 may perform Up-projection operation and Down-Projection operation sequentially on the first specific intermediate feature through the first adaptation block 2200_1, to thereby convert the source domains of the first specific intermediate feature corresponding to the base model 2100 to the target domains corresponding to the specific task of the task head block 2400, i.e., generate the first converted feature. Further, the learning device 500 may perform Up-projection operation and Down-Projection operation sequentially on the second specific intermediate feature through the second adaptation block 2200_2, to thereby convert the source domains of the second specific intermediate feature corresponding to the base model 2100 to the target domains corresponding to the specific task of the task head block 2400, i.e., generate the second converted feature.

And, the learning device 500 may perform processes of (i) inputting the first converted feature generated through the first adaptation block 2200_1 to the first residual unit 2300_1, generating the first residual feature through the first residual block 2310_1 included in the first residual unit 2300_1 and inputting the first residual feature to the first fusion layer 2320_1, and simultaneously (ii) inputting the first converted feature generated through the first adaptation block 2200_1 to the first fusion layer 2320_1 using the skip configuration. Then, the learning device 500 may fuse the first residual feature and the first converted feature through the first fusion layer 2320_1 to thereby generate the first fusion feature.

Further, the learning device 500 may perform processes of (i) fusing the second converted feature generated through the second adaptation block 2200_2 and the first fusion feature generated through the first residual unit 2300_1 to thereby obtain a second temporary feature, inputting the second temporary feature to the second residual unit 2300_2 to thereby generate the second residual feature, and inputting the second residual feature to the second fusion layer 2320_2, and simultaneously (ii) inputting the second temporary feature to the second fusion layer 2320_2 using the skip configuration. Then, the learning device 500 may fuse the second residual feature and the second temporary feature through the second fusion layer 2320_2, to thereby generate the second fusion feature. Herein, the second temporary feature may be obtained through the first fusion layer 2320_1, but it is not limited thereto. As another example, the second temporary feature may be obtained through an auxiliary fusion layer disposed between the first residual unit 2300_1 and the second residual unit 2300_2.

Meanwhile, each of the first residual unit 2300_1 and the second residual unit 2300_2, more specifically each of the first residual block 2310_1 and the second residual block 2310_2, includes multiple convolution layers. Accordingly, convolution operations may be sequentially performed on each of the first residual block 2310_1 and the second residual block 2310_2 to thereby generate each of the first residual feature and the second residual feature. Further, each of the first fusion layer 2320_1 and the second fusion layer 2320_2 may apply at least one of the add operation, the concatenation operation, the weight sum operation etc. as a method for fusing the features. It is understood that a first element-wise add layer 2320_1 and a second element-wise add layer 2320_2 are respectively used as the first fusion layer and the second fusion layer to perform the add operation in FIG. 6.

On the other hand, in case additional cost reduction is needed to train the custom model 2000, a rank of at least part of the first residual unit 2300_1 and the second residual unit 2300_2, more specifically, the rank of at least part of the multiple convolution layers included in the first residual block 2310_1 and the second residual block 2310_2, may be configured as a low-rank, to thereby decrease the number of parameters required for training. Specifically, a first filter having a full-rank, included in each of the multiple convolution layers, may be configured to be disassembled to multiple second filters having a lower rank than the first filter. For instance, in case the first filter has a d×k matrix, the first filter may be disassembled to two second filters having a d×r matrix and a r×k matrix, wherein r is rank. For example, in a matrix with d=5, k=5 with r=1, the first filter with 5×5 requires training for 25 parameters, while the second filters with 5×1, and 1×5 require training for only 10 parameters. Thus, each of the first residual block 2310_1 and the second residual block 2310_2 can be configured as a low-rank, which results in a reduction of the cost for training the custom model 2000. Although the description above only mentions cases in which the first filter is in a form of a 2D matrix, even in case the first filter is in a form of a 3D tensor, the same method of disassembling the first filter to the multiple second filters can be used as well. Of course, if needed, those skilled in the art may achieve the additional reduction of cost by configuring each of the first adaptation block 2200_1 and the second adaptation block 2200_2 with a low-rank as well.

Thereafter, the learning device 500 may input the fusion feature to the task head block 2400, to thereby allow the task head block 2400 to output the task output. For example, if the specific task is related to image classification, the task head block 2400 may be configured as one or more FC (Fully-connected) layers, and if the specific task is related to object detection, the task head block 2400 may be configured as one or more pooling layers and one or more FC layers.

Also, the learning device 500 generates a task loss referring to the task output and Ground Truth (GT) corresponding to the training data, and performs a backpropagation, whose direction is indicated as a dotted arrow, of the task loss to update the parameters of at least part of the task head block 2400, the first residual unit 2300_1, the second residual unit 2300_2, the first adaptation block 2200_1 and the second adaptation block 2200_2. Herein, since the pre-trained first feature extraction block to the pre-trained n-th feature extraction block, e.g., the pre-trained first feature extraction block 2110 to the pre-trained fifth feature extraction block 2150 in FIG. 6, of the base model 2100 are already frozen to fix the parameters, parameters of the pre-trained first feature extraction block to the pre-trained n-th feature extraction block of the base model 2100 are not updated. Thus, since the base model 2100 is not additionally trained, the cost for training is decreased compared to the conventional Full Fine-tuning method, while the advanced inferences can be realized by fusing the features generated from each of the first adaptation block 2200_1, the second adaptation block 2200_2, the first residual unit 2300_1 and the second residual unit 2300_2. Accordingly, the learning performance for the specific task can be achieved.

On the other hand, although (a) and (b) of FIG. 6 are similar in their basic configuration of the custom model 2000, (a) and (b) of FIG. 6 are different with each other in that (a) of FIG. 6 selects, as the first specific intermediate feature and the second specific intermediate feature, the second intermediate feature and the fourth intermediate feature generated respectively through the pre-trained second feature extraction block 2120 and the pre-trained fourth feature extraction block 2140 of the base model 2100 and then inputs each of the second intermediate feature and the fourth intermediate feature to each of the first adaptation block 2200_1 and the second adaptation block 2200_2, while (b) of FIG. 6 selects, as the first specific intermediate feature and the second specific intermediate feature, the third intermediate feature and the fifth intermediate feature generated respectively through the pre-trained third feature extraction block 2130 and the pre-trained fifth feature extraction block 2150 of the base model 2100 and then inputs each of the third intermediate feature and the fifth intermediate feature to each of the first adaptation block 2200_1 and the second adaptation block 2200_2.

Lastly, more specific explanation on the processes of training the custom model including the maximum number of adaptation blocks and the maximum number of residual units will follow by referring FIG. 7, which is extended from the custom model of FIG. 6.

FIG. 7 is a drawing schematically illustrating a custom model including the maximum number of adaptation blocks and the maximum number of residual units in accordance with still another example embodiment of the present disclosure.

For reference, the custom model 3000 illustrated in FIG. 7 is configured to include a base model 3100, a first adaptation block 3200_1 to a fifth adaptation block 3200_5, a first residual unit 3300_1 to a fifth residual unit 3300_5, and a task head block 3400. For convenience of explanation, FIG. 7 illustrates an exemplary configuration of the base model 3100 including the first feature extraction block 3110 to the fifth feature extraction block 3150. Accordingly, the custom model 3000 in FIG. 7 is configured to include the first adaptation block 3200_1 to the fifth adaptation block 3200_5, the first residual unit 3300_1 to the fifth residual unit 3300_5, and task head block 3400, in order to train the custom model 3000 for the most advanced inference. For example, if the base model 3100 includes the pre-trained first feature extraction block to the pre-trained n-th feature extraction block, the custom model 3000 may be configured to include the maximum number of adaptation blocks and the maximum number of redundant units, i.e., n adaptation blocks and n redundant units.

Herein, for example, the learning device 500 inputs training data in a form of image data to the pre-trained base model 3100 in order to perform a specific task such as detecting defect of a circuit substrate, and allows the base model 3100 to perform learning operation through each of a pre-trained first feature extraction block 3110 to a pre-trained fifth feature extraction block 3150 sequentially to thereby generate a first intermediate feature to a fifth intermediate feature. Herein, each of the pre-trained first feature extraction block 3110 to the pre-trained fifth feature extraction block 3150 may be frozen in order to prevent the parameters thereof from being updated, while the backpropagation is performed through the gradient operation. If the base model 3100 is generalized to have n pre-trained feature extraction blocks, each of the first intermediate feature to the n-th intermediate feature may be generated through each of the pre-trained first feature extraction block to the pre-trained n-th feature extraction block.

Also, the learning device 500 may input each of the first intermediate feature to the fifth intermediate feature to each of the first adaptation block 3200_1 to the fifth adaptation block 3200_5. If the base model 3100 is generalized to have n pre-trained feature extraction blocks, the number of adaptation blocks may be set as identical to the number of the feature extraction blocks, which means that there are the first adaptation block to the n-th adaptation block. In this case, the learning device 500 may input each of the first intermediate feature to the n-th intermediate feature to each of the first adaptation block to the n-th adaptation block.

Thereafter, the learning device 500 may apply Up-projection operation and Down-Projection operation sequentially to each of the first intermediate feature to the fifth intermediate feature through each of the first adaptation block 3200_1 to the fifth adaptation block 3200_5, to thereby convert the source domains corresponding to the base model 3100 at each of the first intermediate feature to the fifth intermediate feature to the target domains corresponding to the specific task, i.e., domains corresponding to the task head block 3400, and thus generate the first converted feature to the fifth converted feature. If the base model 3100 is generalized to have n pre-trained feature extraction blocks, the learning device 500 may convert the source domains corresponding to the base model at each of the first intermediate feature to the n-th intermediate feature to the target domains corresponding to the specific task through each of the first adaptation block to the n-th adaptation block, to thereby generate the first converted feature to the n-th converted feature.

And, the learning device 500 may perform processes of (i) inputting the first converted feature generated through the first adaptation block 3200_1 to the first residual unit 3300_1, generating the first residual feature through the first residual block 3310_1 included in the first residual unit 3300_1 and inputting the first residual feature to the first fusion layer 3320_1, and simultaneously (ii) inputting the first converted feature generated through the first adaptation block 3200_1 to the first fusion layer 3320_1 using the skip configuration. Then, the learning device 500 may fuse the first residual feature and the first converted feature through the first fusion layer 3320_1 to thereby generate the first fusion feature.

Further, the learning device 500 may perform processes of (i) fusing the second converted feature generated through the second adaptation block 3200_2 and the first fusion feature generated through the first residual unit 3300_1 to thereby obtain a second temporary feature, inputting the second temporary feature to the second residual unit 3300_2 to thereby generate the second residual feature, and inputting the second residual feature to the second fusion layer 3320_2, and simultaneously (ii) inputting the second temporary feature to the second fusion layer 3320_2 using the skip configuration. Then, the learning device 500 may fuse the second residual feature and the second temporary feature through the second fusion layer 3320_2, to thereby generate the second fusion feature. Herein, the second temporary feature may be obtained through the first fusion layer 3320_1, but it is not limited thereto. As another example, the second temporary feature may be obtained through an auxiliary fusion layer disposed between the first residual unit 3300_1 and the second residual unit 3300_2.

Thereafter, the learning device 500 may repeatedly perform processes of allowing the third residual unit 3300_3 to the fifth residual unit 3300_5 to generate the third fusion feature to the fifth fusion feature in a similar way to the process of the second residual unit 3300_2 having generated the second fusion feature. If the base model 3100 is generalized to have n pre-trained feature extraction blocks, the number of residual units may be set as identical to the number of the adaptation blocks, which means that there are the first residual unit to the n-th residual unit. The similar processes would be repeated for the second residual unit to the n-th residual unit. The processes are same with the previously described process of S20_2 of FIG. 5 while repeated until i becomes n. Of course, in the S20_2 process in FIG. 5, we explained that the maximum value of i is k, but in the S20_1 process, we explained that the maximum value of k is n, so i represents an integer of from 2 to n. Herein, n is the maximum value.

Also, each of the first residual unit 3300_1 to the fifth residual unit 3300_5, more specifically each of the first residual block 3310_1 and the fifth residual block 3310_5, includes multiple convolution layers. Accordingly, convolution operations may be sequentially performed on each of the first residual block 3310_1 to the fifth residual block 3310_2 to thereby generate each of the first residual feature to the fifth residual feature. Further, each of the first fusion layer 3320_1 to the fifth fusion layer 3320_5 may apply at least one of the add operation, the concatenation operation, the weight sum operation etc. as a method for fusing the features. It is understood that each of a first element-wise add layer 3320_1 to a fifth element-wise add layer 3320_5 is respectively used as each of the first fusion layer to the fifth fusion layer to perform the add operation in FIG. 7. Likewise, this may be generalized as the first residual unit to the n-th residual unit. The detailed explanation thereon will be omitted since it is similar to S20_2 of FIG. 5.

On the other hand, in case additional cost reduction is needed to train the custom model 3000, a rank of at least part of the first residual unit 3300_1 to the fifth residual unit 3300_2, more specifically, the rank of at least part of the multiple convolution layers included in the first residual block 3310_1 to the fifth residual block 3310_5, may be configured as a low-rank, to thereby decrease the number of parameters required for training. If it is generalized as the first residual block to the n-th residual block, at least part of the multiple convolution layers included in each of the first residual block to the n-th residual block of the first residual unit to the n-th residual unit may be configured as a low-rank, and a first filter having a full-rank included in each of the multiple convolution layers, may be configured to be disassembled to multiple second filters having a lower rank than the first filter. Of course, if needed, those skilled in the art may achieve the additional cost reduction by configuring the first adaptation block 3200_1 to the fifth adaptation block 3200_5 as a low-rank as well. For example, if generalized to the maximum number, the first adaptation block to the n-th adaptation block may be configured as a low-rank as well.

Thereafter, the learning device 500 may input the fusion feature to the task head block 3400, to thereby allow the task head block 3400 to output the task output. Also, the learning device 500 may generate a task loss referring to the task output and Ground Truth (GT) corresponding to the training data, and perform a backpropagation, whose direction is indicated as a dotted arrow, of the task loss to update the parameters of at least part of the task head block 3400, the first residual unit 3300_1 to the fifth residual unit 3300_5, the first adaptation block 3200_1 to the fifth adaptation block 3200_5, and the first adaptation block 3200_1 to the third adaptation block 3200_5. If it is generalized, the learning device 500 may be trained to update the parameters of at least part of the task head block, the first residual unit to the n-th residual unit and the first adaptation block to the n-th adaptation block.

Herein, since the pre-trained first feature extraction block 3110 to the pre-trained fifth feature extraction block 3150 (if generalized, the pre-trained first feature extraction block to the pre-trained n-th feature extraction block) of the base model 3100 are already frozen to fix the parameters thereof, parameters of the pre-trained first feature extraction block 3110 to the pre-trained fifth feature extraction block 3150 of the base model 3100 are not updated. Thus, since the base model 3100 is not additionally trained, the cost for training is decreased compared to the conventional Full Fine-tuning method, while the advanced inferences can be realized by fusing each of the features generated from the first adaptation block 3200_1 to the fifth adaptation block 3200_5, and the first residual unit 3300_1 to the third residual unit 3300_5. Accordingly, the learning performance for the specific task can be achieved.

The present disclosure has an effect of configuring a custom model including a base model having at least one pre-trained feature extraction block, at least one adaptation block, at least one residual unit, and a task head block, and updating at least part of the task head block, the at least one residual unit and the at least one adaptation block through a backpropagation using a task loss, while not updating parameters of the base model.

The present disclosure has another effect of fusing at least one residual feature (generated through the at least one residual unit) and at least one converted feature (generated by converting the at least one intermediate feature through the at least one adaptation block), to thereby allow a learning device to achieve an advanced inference.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training a custom model based on a pre-trained base model, the method comprising steps of:
   (a) (1) inputting, by a learning device, training data to a custom model that performs a specific task, wherein the custom model includes a base model having a pre-trained first feature extraction block to a pre-trained n-th feature extraction block, wherein n is an integer greater than or equal to 2, a first adaptation block to a k-th adaptation block, wherein k is an integer greater than or equal to 2 and less than or equal to n, a first residual unit to a k-th residual unit, and a task head block, (2) generating, by the learning device, a first intermediate feature to an n-th intermediate feature through each of the pre-trained first feature extraction block to the pre-trained n-th feature extraction block of the base model, and (3) selecting, by the learning device, a first specific intermediate feature to a k-th specific intermediate feature respectively among the first intermediate feature to the n-th intermediate feature, and converting, by the learning device, source domains of the first specific intermediate feature to the k-th specific intermediate feature respectively to target domains corresponding to the specific task through the first adaptation block to the k-th adaptation block respectively, to thereby generate a first converted feature to a k-th converted feature respectively, wherein the source domains correspond to the base model;
   (b) (1) fusing, by the learning device, a first residual feature and the first converted feature through the first residual unit, to thereby generate a first fusion feature, wherein the first residual feature is extracted from the first converted feature for the specific task, (2) fusing, by the learning device, an (i−1)-th fusion feature and an i-th converted feature, to thereby generate an i-th temporary feature, wherein i is an integer greater than or equal to 2 and less than or equal to k, (3) fusing, by the learning device, an i-th residual feature and the i-th temporary feature, to thereby generate an i-th fusion feature, wherein the i-th residual feature is extracted from the i-th temporary feature for the specific task, and (4) applying, by the learning device, a learning operation to a k-th fusion feature through the task head block to thereby generate a task output, wherein the k-th fusion feature is outputted from the k-th residual unit; and
   (c) (1) generating, by the learning device, a task loss referring to the task output and Ground Truth corresponding to the training data, and (2) performing, by the learning device, a backpropagation of the task loss, wherein the task head block is an output layer, and wherein the backpropagation is performed with the task loss and weight parameters of the output layer and the first to the k-th adaptation blocks being updated by applying a gradient operation, to reduce costs spent for training.

2. The method of claim 1, wherein, at the step of (a):
   (1) the learning device selects the n-th intermediate feature or an (n−1)-th intermediate feature among the first intermediate feature to the n-th intermediate feature and converts the source domains to the target domains, through an adaptation block among the first adaptation block to the k-th adaptation block, to thereby generate a converted feature; and
   (2) the learning device selects an intermediate feature among a second intermediate feature to an (n−2)-th intermediate feature and converts the source domains to the target domains, through another adaptation block among the first adaptation block to the k-th adaptation block, to thereby generate another converted feature.

3. The method of claim 1, wherein:
   at the step of (a), each of the first residual unit to the k-th residual unit is configured to have multiple convolution layers;
   a first filter contained in at least part of the multiple convolution layers is disassembled to multiple second filters; and
   the multiple second filters have a lower rank than the first filter.

4. The method of claim 1, wherein:
   at the step of (a), each of the pre-trained first feature extraction block to the pre-trained n-th feature extraction block has parameters which are fixed through freezing; and
   at the step of (c), when the backpropagation of the task loss is performed, the learning device does not update the parameters of each of the pre-trained first feature extraction block to the pre-trained n-th feature extraction block.

5. The method of claim 1, wherein, at the step of (b):
   (1) the learning device applies an add operation to the first residual feature and the first converted feature through a first element-wise add layer, to thereby generate the first fusion feature;
   (2) the learning device applies an add operation to the i-th converted feature and the (i−1)-th fusion feature through an (i−1)-th element-wise add layer, to thereby generate the i-th temporary feature; and
   (3) the learning device applies an add operation to the i-th residual feature and the i-th temporary feature through an i-th element-wise add layer, to thereby generate the i-th fusion feature.

6. A method for training a custom model based on a pre-trained base model, the method comprising steps of:

(a) (1) inputting, by a learning device, training data to a custom model that performs a specific task, wherein the custom model includes a base model, an adaptation block, a residual unit, and a task head block, wherein n is an integer greater than or equal to 1, and wherein the base model has a pre-trained first feature extraction block to a pre-trained n-th feature extraction block, (2) generating, by the learning device, a first intermediate feature to an n-th intermediate feature through each of the pre-trained first feature extraction block to the pre-trained n-th feature extraction block of the base model, and (3) selecting, by the learning device, a specific intermediate feature among the first intermediate feature to the n-th intermediate feature, and converting, by the learning device, source domains of the specific intermediate feature to target domains corresponding to the specific task through the adaptation block, to thereby generate a converted feature, wherein the source domains correspond to the base model;

(b) (1) fusing, by the learning device, a residual feature and the converted feature through the residual unit, to thereby generate a fusion feature, wherein the residual feature is extracted from the converted feature for the specific task, and (2) applying, by the learning device, a learning operation to the fusion feature through the task head block to thereby generate a task output; and (c) (1) generating, by the learning device, a task loss referring to the task output and Ground Truth corresponding to the training data, and (2) performing, by the learning device, a backpropagation of the task loss, wherein the task head block is an output layer, and wherein the backpropagation is performed with the task loss and weight parameters of the output layer and the adaptation block being updated by applying a gradient operation, to reduce costs spent for training.

7. The method of claim 6, wherein, at the step of (a), (1) the learning device selects a second intermediate feature or an (n−1)-th intermediate feature and converts the source domains to the target domains, through the adaptation block, to thereby generate the converted feature.

8. The method of claim 6, wherein;
at the step of (a):
   the residual unit is configured to have multiple convolution layers, and
   a first filter contained in at least part of the multiple convolution layers is disassembled to multiple second filters; and
the multiple second filters have a lower rank than the first filter.

9. The method of claim 6, wherein:
at the step of (a), each of the pre-trained first feature extraction block to the pre-trained n-th feature extraction block has parameters which are fixed through freezing; and
at the step of (c), when the backpropagation of the task loss is performed, the learning device does not update the parameters of each of the pre-trained first feature extraction block to the pre-trained n-th feature extraction block.

10. The method of claim 6, wherein, at the step of (b), the learning device applies an add operation to the residual feature and the converted feature through an element-wise add layer, to thereby generate the fusion feature.

11. A learning device for training a custom model based on a pre-trained base model, comprising:
at least one memory that stores instructions; and
at least one processor configured to execute the instructions to perform processes of:

(I) (1) inputting training data to a custom model that performs a specific task, wherein the custom model includes a base model having a pre-trained first feature extraction block to a pre-trained n-th feature extraction block, wherein n is an integer greater than or equal to 2, a first adaptation block to a k-th adaptation block, wherein k is an integer greater than or equal to 2 and less than or equal to n, a first residual unit to a k-th residual unit, and a task head block, (2) generating a first intermediate feature to an n-th intermediate feature through each of the pre-trained first feature extraction block to the pre-trained n-th feature extraction block of the base model, and (3) selecting a first specific intermediate feature to a k-th specific intermediate feature respectively among the first intermediate feature to the n-th intermediate feature, and converting source domains of the first specific intermediate feature to the k-th specific intermediate feature respectively to target domains corresponding to the specific task through the first adaptation block to the k-th adaptation block respectively, to thereby generate a first converted feature to a k-th converted feature respectively, wherein the source domains correspond to the base model;

(II) (1) fusing a first residual feature and the first converted feature through the first residual unit, to thereby generate a first fusion feature, wherein the first residual feature is extracted from the first converted feature for the specific task, (2) fusing an (i−1)-th fusion feature and an i-th converted feature, to thereby generate an i-th temporary feature, wherein i is an integer greater than or equal to 2 and less than or equal to k, (3) fusing an i-th residual feature and the i-th temporary feature, to thereby generate an i-th fusion feature, wherein the i-th residual feature is extracted from the i-th temporary feature for the specific task, and (4) applying a learning operation to a k-th fusion feature through the task head block to thereby generate a task output, wherein the k-th fusion feature is outputted from the k-th residual unit; and (III) (1) generating a task loss referring to the task output and Ground Truth corresponding to the training data, and (2) performing a backpropagation of the task loss, wherein the task head block is an output layer, and wherein the backpropagation is performed with the task loss and weight parameters of the output layer and the first to the k-th adaptation blocks being updated by applying a gradient operation, to reduce costs spent for training.

12. The learning device of claim 11, wherein, at the process of (I):
(1) the processor selects the n-th intermediate feature or an (n−1)-th intermediate feature among the first intermediate feature to the n-th intermediate feature and converts the source domains to the target domains, through an adaptation block among the first adaptation block to the k-th adaptation block, to thereby generate a converted feature; and
(2) the processor selects an intermediate feature among a second intermediate feature to an (n−2)-th intermediate feature and converts the source domains to the target domains, through another adaptation block among the first adaptation block to the k-th adaptation block, to thereby generate another converted feature.

13. The learning device of claim 11, wherein:
at the process of (I), each of the first residual unit to the k-th residual unit is configured to have multiple convolution layers;
a first filter contained in at least part of the multiple convolution layers is disassembled to multiple second filters; and
the multiple second filters have a lower rank than the first filter.

14. The learning device of claim 11, wherein:
at the process of (I), each of the pre-trained first feature extraction block to the pre-trained n-th feature extraction block has parameters which are fixed through freezing; and
at the process of (III), when the backpropagation of the task loss is performed, the processor does not update the parameters of each of the pre-trained first feature extraction block to the pre-trained n-th feature extraction block.

15. The learning device of claim 11, wherein, at the process of (II):
(1) the processor applies an add operation to the first residual feature and the first converted feature through a first element-wise add layer, to thereby generate the first fusion feature;
(2) the processor applies an add operation to the i-th converted feature and the (i−1)-th fusion feature through an (i−1)-th element-wise add layer, to thereby generate the i-th temporary feature; and
(3) the processor applies an add operation to the i-th residual feature and the i-th temporary feature through an i-th element-wise add layer, to thereby generate the i-th fusion feature.

16. A learning device for training a custom model based on a pre-trained base model, comprising:
at least one memory that stores instructions; and
at least one processor configured to execute the instructions to perform processes of:
(I) (1) inputting training data to a custom model that performs a specific task, wherein the custom model includes a base model, an adaptation block, a residual unit, and a task head block, wherein n is an integer greater than or equal to 1, and wherein the base model has a pre-trained first feature extraction block to a pre-trained n-th feature extraction block, (2) generating a first intermediate feature to an n-th intermediate feature through each of the pre-trained first feature extraction block to the pre-trained n-th feature extraction block of the base model, and (3) selecting a specific intermediate feature among the first intermediate feature to the n-th intermediate feature, and converting source domains of the specific intermediate feature to target domains corresponding to the specific task through the adaptation block, to thereby generate a converted feature, wherein the source domains correspond to the base model;
(II) (1) fusing a residual feature and the converted feature through the residual unit, to thereby generate a fusion feature, wherein the residual feature is extracted from the converted feature for the specific task, and (2) applying a learning operation to the fusion feature through the task head block to thereby generate a task output; and
(III) (1) generating a task loss referring to the task output and Ground Truth corresponding to the training data, and (2) performing a backpropagation of the task loss, wherein the task head block is an output layer, and wherein the backpropagation is performed with the task loss and weight parameters of the output layer and the adaptation block being updated by applying a gradient operation, to reduce costs spent for training.

17. The learning device of claim 16, wherein, at the process of (I), (1) the processor selects a second intermediate feature or an (n−1)-th intermediate feature and converts the source domains to the target domains, through the adaptation block, to thereby generate the converted feature.

18. The learning device of claim 16, wherein;
at the process of (I):
the residual unit is configured to have multiple convolution layers; and
a first filter contained in at least part of the multiple convolution layers is disassembled to multiple second filters; and
the multiple second filters have a lower rank than the first filter.

19. The learning device of claim 16, wherein;
at the process of (I), each of the pre-trained first feature extraction block to the pre-trained n-th feature extraction block has parameters which are fixed through freezing; and
at the process of (III), when the backpropagation of the task loss is performed, the processor does not update the parameters of each of the pre-trained first feature extraction block to the pre-trained n-th feature extraction block.

20. The learning device of claim 16, wherein, at the process of (II), the processor applies an add operation to the residual feature and the converted feature through an element-wise add layer, to thereby generate the fusion feature.

* * * * *